(12) United States Patent
Park et al.

(10) Patent No.: US 7,526,451 B2
(45) Date of Patent: Apr. 28, 2009

(54) METHOD OF TRANSFERRING DIGITAL RIGHTS

(75) Inventors: Joon Young Park, Libertyville, IL (US); Hosame H. Abu-Amara, Round Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 566 days.

(21) Appl. No.: 11/346,795

(22) Filed: Feb. 3, 2006

(65) Prior Publication Data
US 2007/0198419 A1 Aug. 23, 2007

(51) Int. Cl.
*G06Q 99/00* (2006.01)
(52) U.S. Cl. .............. 705/51; 705/59; 705/57; 380/200; 726/26
(58) Field of Classification Search .......... 705/50–79; 726/26–33; 380/200–203
See application file for complete search history.

(56) References Cited

U.S. PATENT DOCUMENTS

| | | | | |
|---|---|---|---|---|
| 5,878,415 | A * | 3/1999 | Olds | 707/9 |
| 7,406,593 | B2 * | 7/2008 | Rabin et al. | 713/150 |
| 2003/0131252 | A1 * | 7/2003 | Barton | 713/193 |
| 2004/0103066 | A1 | 5/2004 | Staddon et al. | |
| 2005/0071280 | A1 | 3/2005 | Irwin et al. | |
| 2005/0108368 | A1 * | 5/2005 | Mohan et al. | 709/220 |
| 2005/0172127 | A1 | 8/2005 | Hartung et al. | |
| 2005/0234830 | A1 | 10/2005 | Schneider | |
| 2006/0021056 | A1 | 1/2006 | Koppen | |
| 2007/0156842 | A1 * | 7/2007 | Vermeulen et al. | 709/217 |

OTHER PUBLICATIONS

Michael Mitzenmacher, "Compressed Bloom Filters", Oct. 2002, IEEE/ACM transactions on networking, vol. 10, No. 5, pp. 604-612.*

* cited by examiner

*Primary Examiner*—Jalatee Worjloh
(74) *Attorney, Agent, or Firm*—Hisashi D. Watanabe

(57) ABSTRACT

A system and method of transferring digital rights from a first device to a second device. A target rights management object is transferred from the first device to the second device. A probabilistic data structure is created that identifies each of a class of rights management objects that are present on the first device. The probabilistic data structure is employed to determine whether the target rights management object is present on the first device. The target rights management object is utilized on the second device in response to a determination through employment of the probabilistic data structure that the target rights management object is not present on the first device. The target rights management object and its state are returned to the first device in response to a determination through employment of the probabilistic data structure that the target rights management object is present on the first device.

13 Claims, 7 Drawing Sheets

METHOD OF TRANSFERRING DIGITAL RIGHTS

FIELD

This application relates generally to Digital Rights Management, and more particularly to the transfer of digital rights.

BACKGROUND

Digital Rights Management (DRM) is a term that broadly describes the many ways by which media providers enforce limitations on the use and distribution of media. There are a number of DRM schemes in use today. For example, Apple Computer® uses a DRM system called FairPlay, to prevent content sold from the iTunes Music Store® from being played on unauthorized devices. Windows Media® DRM is a system, implemented through the Windows Media Player®, which protects audio and visual content. Mobile content providers use the Open Mobile Alliance (OMA) DRM system to protect mobile media content. These are only a few of the DRM systems that are in use today.

One difficulty in implementing DRM is the inherent tension between protecting content and providing consumers with the flexibility to manage the content they purchase in a reasonable way. For instance, it is common for DRM systems to limit the playback of content to a single device. This prevents users from engaging in the unauthorized transfer of media files. Yet, there are situations in which it is reasonable for an owner of digital media to transfer files to another device. For instance, a consumer might purchase a song only to find that he or she does not like it. The consumer may want to sell the song to another person, but be prevented from doing so by a DRM system. In another instance, a consumer may purchase a new media player and simply want to move media from an old device to a new device. On the other hand, if a DRM system allows the transfer of rights to other devices, it is possible that unethical users could transfer their rights to new devices while simultaneously retaining the rights on the old devices. In this way, the DRM system would be circumvented.

Accordingly, what is needed is a system and method that allows a user to transfer digital rights from a first device to a second device while verifying that the digital rights have actually been removed from the first device. Because such a system will necessarily not allow multiple devices to hold the same digital rights, there is no "back up" of the rights so it is important that the rights not be damaged or corrupted during transfer or the rights will be lost to the consumer. Therefore, what is also needed is a system and method that allows a user to transfer digital rights from a first device to a second device while maintaining the integrity of the rights during transfer.

SUMMARY

In one embodiment, a method of transferring digital rights from a first device to a second device is provided. A target rights management object is transferred from the first device to the second device. A probabilistic data structure is created that identifies each of a class of rights management objects that are present on the first device. The probabilistic data structure is employed to determine whether the target rights management object is present on the first device. The target rights management object is utilized on the second device in response to a determination through employment of the probabilistic data structure that the target rights management object is not present on the first device.

In one embodiment, the target rights management object is returned to the first device in response to a determination through employment of the probabilistic data structure that the target rights management object is present on the first device.

In one embodiment, an encrypted target rights management object is created by encrypting the target rights management object with an encryption key. The encrypted target rights management object is sent to the second device. The target rights management object is removed from the first device upon receipt of an acknowledgement from the second device that it received the encrypted version of the target rights management object. The encryption key used to encrypt the target rights management object is sent to the second device in response to a determination through employment of the probabilistic data structure that the target rights management object is not present on the first device. The encryption key is received and the encrypted target rights management object is decrypted with the encryption key.

In one embodiment, the probabilistic data structure is created by generating a bloom filter that includes a bit representation of each of the class of rights management objects that are present on the first device. The bloom filter is queried to determine whether the target rights management object is present on the first device. The bloom filter is generated by assigning a unique identifier to each rights management object present on the first device. The unique identifier of each rights management object is provided as an input to at least one hash function to create at least one hash value. A bit in the bloom filter, corresponding to the at least one hash value, is asserted as positive. The unique identifier is assigned by computing the identifier by using a combination of each rights management object and each rights management object's state as input to a hash function.

In one embodiment, the target rights management object is verified as present on the first device prior to transferring the target rights management object to the second device. A unique identifier is assigned to the target rights management object. A bloom filter is generated that includes a bit representation of each of a class of rights management objects that are present on the first device. The bloom filter is queried to determine whether a bit representation of the target rights management object is present on the first device.

In one embodiment the probabilistic data structure is created by including in the class of rights management objects all stateful rights objects on the first device. In one embodiment, the probabilistic data structure is created by including only a portion of the stateful rights objects on the first device.

In one embodiment, the target rights management object is a stateful rights object created in accordance with Open Mobile Alliance (OMA) Digital Rights Management (DRM) standards.

In one embodiment, a method of transferring a rights management object is provided. The rights management object is received. A probabilistic data structure identifying each of a class of rights management objects present on the transferring device is received. The probabilistic data structure is employed to determine whether the rights management object is present on the first device. The rights management object is utilized in response to a determination through employment of the probabilistic data structure that the rights management object is not present on the transferring device.

In one embodiment, a method of transferring digital rights from a device is provided. A rights management object is removed from the device. A probabilistic data structure is generated that identifies each of a class of rights management objects present on the device. The probabilistic data structure is provided to another device to verify whether the rights management object has been removed from the device.

In one embodiment, a method of transferring digital rights is provided. A stateful rights object is sent from a first device to a second device. An acknowledgement is sent to the first device that the second device received the stateful rights object. The stateful rights object is deleted from the first device. A bloom filter is created, at the first device, that includes a bit representation for each stateful rights object that is present in the first device. The bloom filter is sent to the second device. The bloom filter is searched, at the second device, to determine whether the stateful rights object is present at the first device. The stateful rights object is utilized on the second device if the target rights management object is not present on the first device. The stateful rights object is returned to the first device if the stateful rights object is present on the first device.

In one embodiment, a method of transferring digital rights is provided. A stateful rights object is sent from a first device to a second device. An acknowledgement is sent from second device to the first device that the second device received the stateful rights object. The stateful rights object is deleted from the first device only after receiving the acknowledgement from the first device.

In one embodiment, it is verified whether or not the stateful rights object has been deleted from the first device. The stateful rights object is returned to the first device if the stateful rights object has not been deleted from the first device.

In one embodiment, the stateful rights object is encrypted prior to sending the stateful rights object to the second device. The second device requests an encryption key from the first device if the stateful rights object has been deleted from the first device. The encryption key is received and the stateful rights object is decrypted. In one embodiment, the second device sends the encrypted stateful rights object back to the first device when the second device verifies that the first device still has the stateful rights object by using probabilistic data structure.

BRIEF DESCRIPTION OF THE DRAWINGS

For the purpose of facilitating an understanding of the subject matter sought to be protected, there are illustrative embodiments in the accompanying drawing, from an inspection of which, when considered in connection with the following description and claims, the subject matter sought to be protected, its construction and operation, and many of its advantages should be readily understood and appreciated

DETAILED DESCRIPTION

Figure 1:
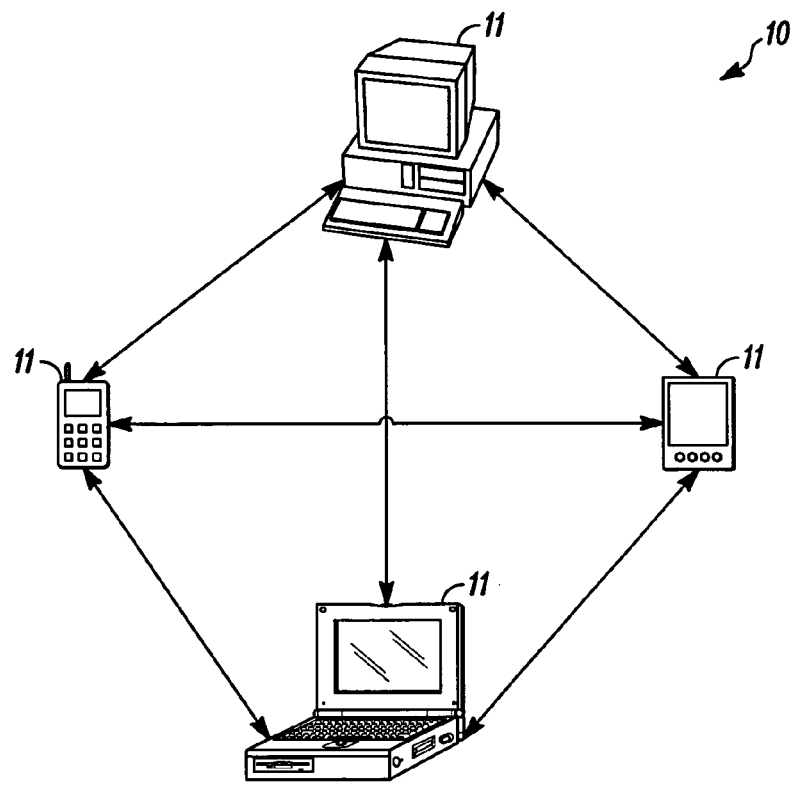
FIG. 1 depicts a plurality of exemplary devices, in direct communication, which can transfer digital rights to each other.
Figure 2:
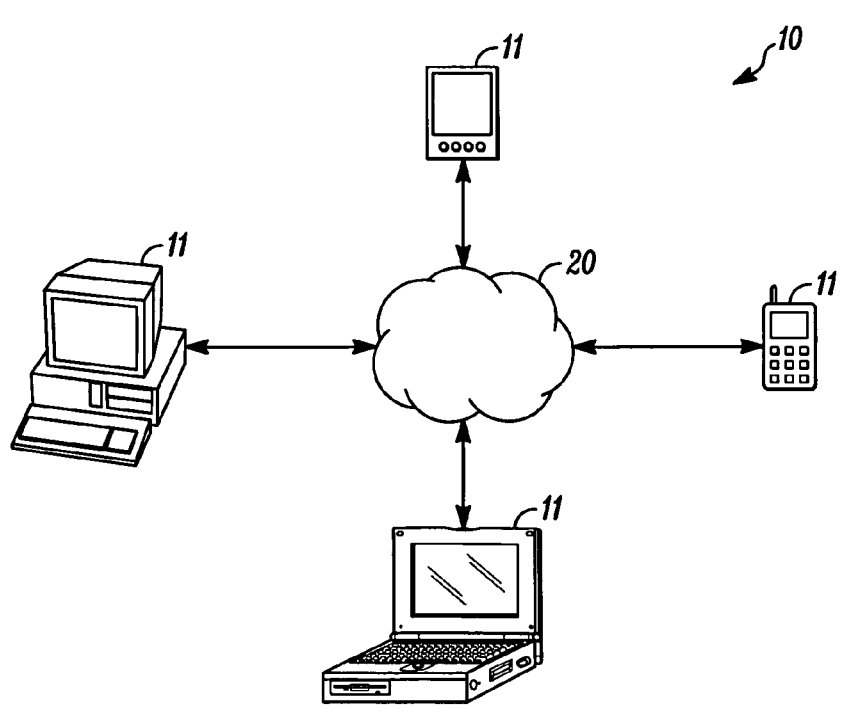
FIG. 2 depicts the plurality of devices shown in FIG. 1 in communication through a network.

Referring to FIGS. 1 and 2, an exemplary system 10, including devices which can transfer digital rights, is shown for illustrative purposes. System 10, in one example comprises one more devices 11. Examples of a device 11 include personal computers, laptop computers, personal digital assistants ("PDA"), mobile telephones, media players, workstations, file servers, mainframes, etc. A device 11 could also be a removable component, such as a removable media card, of the one of the aforementioned devices. A computing device 11 can also be a combination of one of the aforementioned devices.

The devices 11 can communicate with each other directly or through a network. FIG. 1 depicts as a plurality of devices 11 communicating directly. FIG. 2 depicts the devices 11 communicating through a network 20. The network 20 is any network that allows devices 11 to communicate (e.g., a Local Area Network ("LAN"), a Wide Area Network ("WAN"), a wireless LAN, a wireless WAN, the Internet, a wireless telephone network, etc.). Network 20 can also be a combination of the above recited networks. Similarly, FIGS. 1 and 2 could be combined such that some devices 11 communicate directly while others communicate over the network 20. The devices 11 communicate with each other and to the network 20 through landlines (e.g., T1, DSL, Cable, POTS) or wireless technology (e.g. Bluetooth, IR, WiFi, etc.) The communications between devices 11 can either be secure or non-secure. Although for the purposes of transferring digital rights, secure links advantageously prevent the hijacking of digital rights.

Figure 3:
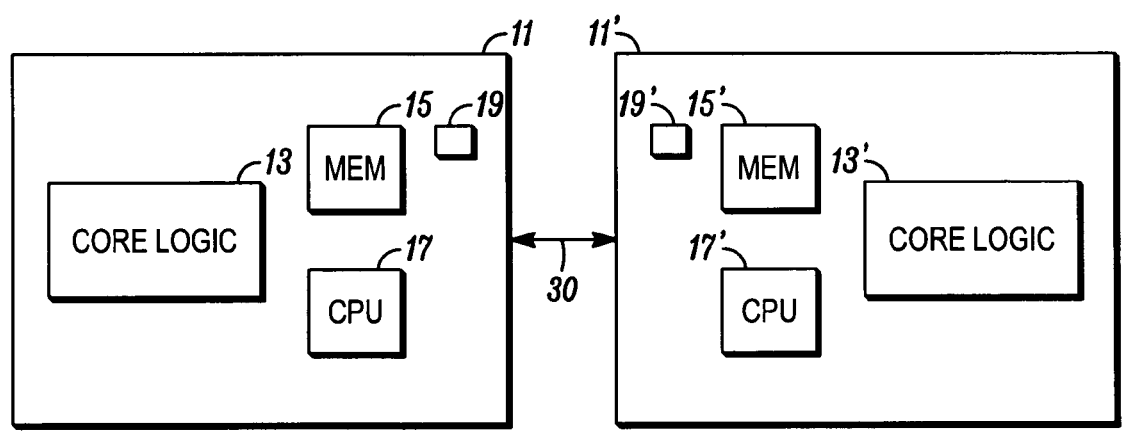
FIG. 3 is a functional block diagram depicting two of the exemplary devices, shown in FIGS. 1 and 2, in communication with each other.

FIG. 3 shows a first exemplary device 11 and a second exemplary device 11'. Devices 11, 11' are connected together through a communication link 30. The communication link 30, as shown in FIGS. 1 and 2, can be either a direct link or through a network; secure or non-secure; wired or wireless. Each device 11, 11' includes a plurality of components such as computer software and/or hardware components. A number of such components can be combined or divided. In one example, these components include core logic 13, 13', memory 15, 15', and CPU 17, 17'. Core logic 13, 13'includes device specific hardware and/or software components that allow the devices 11, 11' to perform their core function (e.g. media player, mobile phone, etc.). Memory 15, 15' is storage on which devices 11, 11' store software, media, data, etc. CPUs 17, 17' are the central processors that control the operation of each device 11, 11'. An exemplary component of each device 11, 11' employs and/or comprises a series of computer instructions written in or implemented with any of a number of programming languages, as will be appreciated by those skilled in the art. It should be noted that the preceding component descriptions are for illustrative purposes only. It is envisioned that the methodology disclosed herein can be performed on other devices with other configurations.

Each device 11, 11' employs at least one computer-readable signal-bearing medium 19, 19'. One example of a computer-readable signal-bearing medium is a recordable data storage medium such as a magnetic, optical, and/or atomic scale data storage medium. In another example, a computer-readable signal-bearing medium is a modulated carrier signal transmitted over a network coupled to the 11, 11' device.

An exemplary description of a method for transferring digital rights between the first device 11 and the second device 11' will now be provided for illustrative purposes. It should be noted that some DRM systems and implementations include the state in the "stateful rights objects", while others, such as OMA DRM, specify the state in a physically separate location from the "stateful rights object" and specify an association between the state and the "stateful rights object". The reason that some DRM systems do this separation is that the "stateful rights object" may be such that a device cannot modify it in any way, even to write the state into it. Perhaps we can say in the body of the application that the term "stateful rights object" includes both the case when the state is specified in the rights object itself, and the case in which the state is separate from the rights object and an association exists between the state and the rights object. Then, we can remove the specification of the rights object and its state.

In one example, the first device 11 and the second device 11' are mobile devices that manage digital media in accordance with the OMA DRM v. 2.0 standard, which is hereby incorporated by reference. OMA DRM v. 2.0 uses the concept of a Rights Object (RO) to grant a digital license for devices to consume protected media content. Such a RO may include restrictions on the how the content can be consumed. Examples of such restrictions include <count>, which limits the number of times the protected content can be consumed, and <interval>, which specifies a period of time during which the protected media content can be consumed. When a RO contains such restrictions, the RO is described as being a "stateful" RO (referred to hereinafter as a "SRO").

It will be understood that some DRM systems and implementations include the associated state of a rights object in the SRO, while others, such as OMA DRM, specify the state in a physically separate location from the SRO and specify an association between the state and the SRO. Accordingly, for the purposes of this application, the term "stateful rights object" or SRO is meant to refer to both cases, i.e. when the state is specified in the rights object itself, and the case in which the state is separate from the rights object and an association exists between the state and the rights object.

Figure 4:
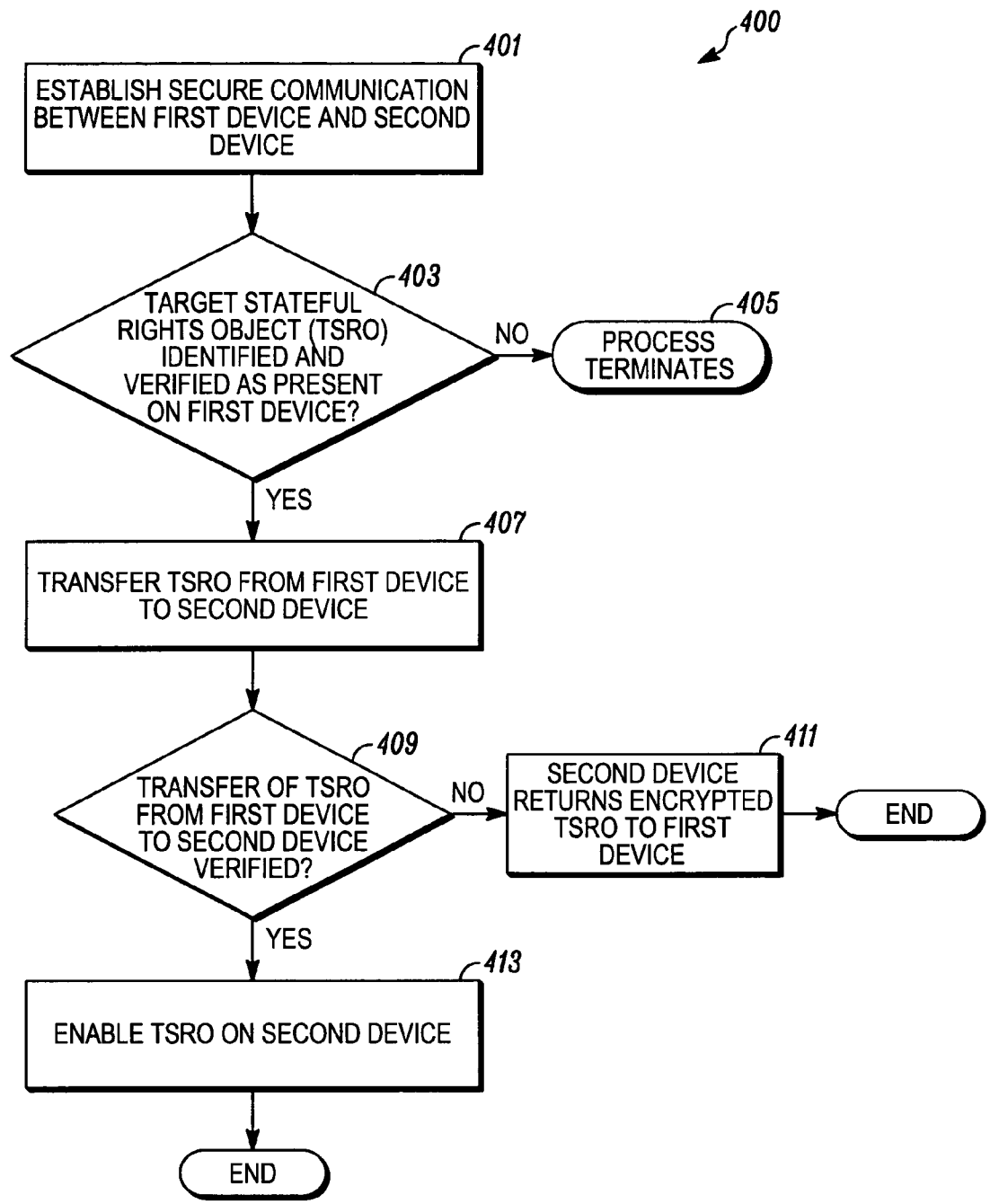
FIG. 4 is a flowchart depicting one embodiment of a method for transferring digital rights from a first device to a second device.

Referring now to FIG. 4, a flowchart depicts a method 400 by which SROs can be transferred from the first device 11 to the second device 11. The process begins at step 401, in which secure communication is established between the first device 11 and the second device 11'. The communications between first device 11 and second device 11' can be rendered secure by any appropriate communications protocol, such as SSL, TLS, HTTPS, etc. When secure communication is established, the first device 11, in step 403, identifies the SRO to be transferred to the second device (the SRO to be transferred will hereinafter be referred to as the "target SRO" or "TSRO"). In step 403, the first device 11 also allows the second device 11' to verify that the TSRO is actually present on the first device 11. If the second device 11' fails to verify that the TSRO is present on the first device 11, then an error condition occurs and the process 400 terminates at step 405. If the second device 11' verifies that the TSRO is present on the first device 11, then flow progresses to step 407, in which the first device 11 transfers the TSRO to the second device 11'. In step 409, the second device 11' is given the opportunity to verify that the TSRO is no longer present on the first device 11. If the second device 11' can not verify that the TSRO is no longer present on the first device, then the TSRO is returned, in step 411, to the first device 11 and the method terminates.

Otherwise, if the second device 11' verifies that the TSRO is not present on the first device 11, then in step 413, the second device 11' enables the TSRO.

Figure 5:
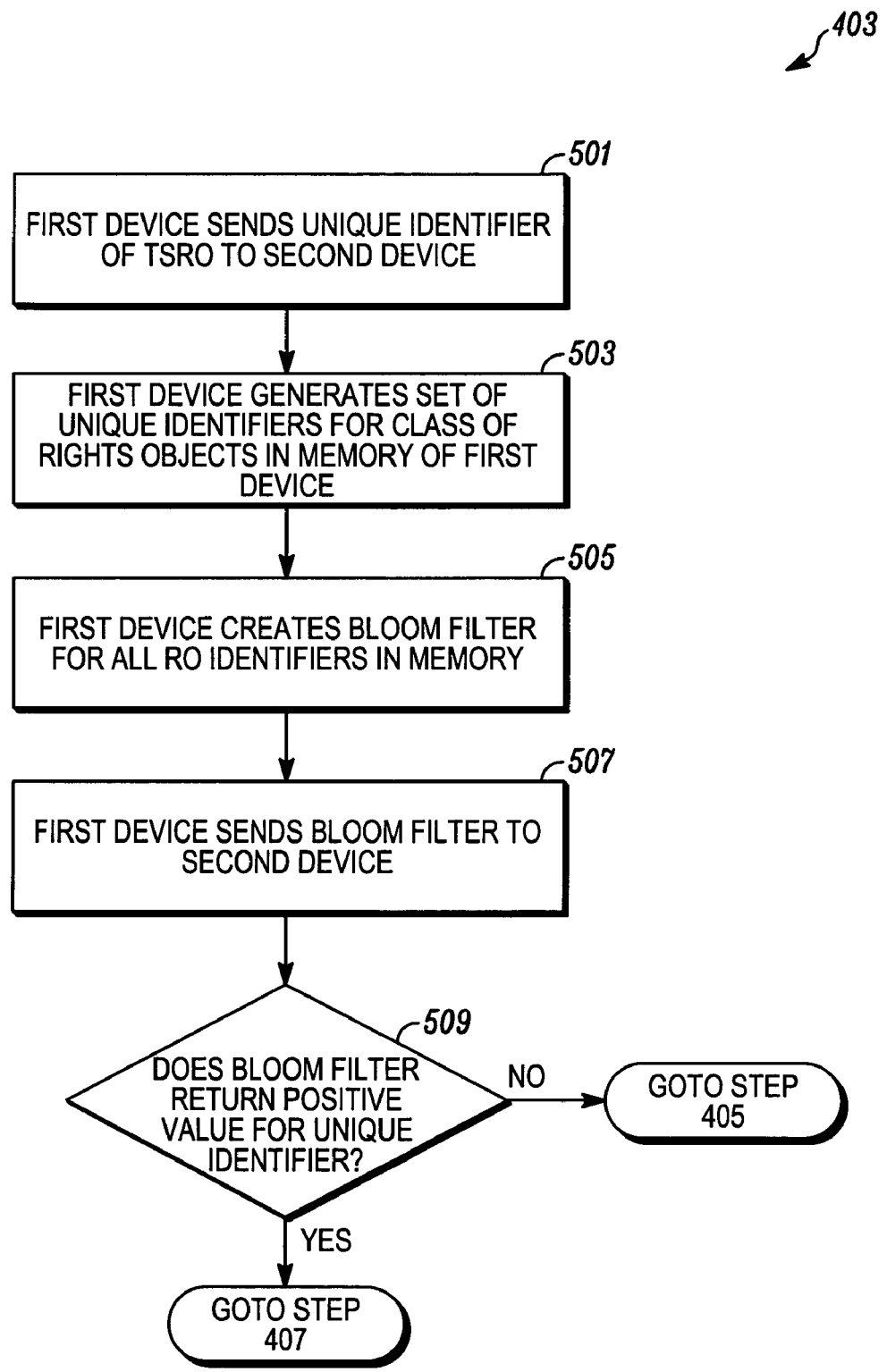
FIG. 5 is a flowchart depicting one embodiment of the step for identifying and verifying a digital rights object to be transferred in the method of FIG. 4.

Referring to FIG. 5, an exemplary embodiment of step 403, in which the TSRO is identified and verified is now provided for illustrative purposes.

In step 501, the first device 11 generates a unique identifier for the TSRO and sends it to the second device 11'. The unique identifier is any information that will allow the second device 11' to identify TSRO during method 400. For example, the unique identifier can be generated as a secure hash value from the combination between the binary specification of the RO and its state (e.g. H(RO|state). Examples of a secure hash include MD5, SHA-1, and HMAC. Then, in step 503, the first device 11 generates a set of unique identifiers for a class of ROs other than the TSRO that are present in its memory. In one example, this class includes all of the other ROs in the first device's 11 memory. In another example, the class includes a portion of the ROs that are in the first device's 11 memory. For instance, if the TSRO relates to digital audio, then the first device 11 might only assign identifiers to the other ROs that relate to digital audio.

Once the identifiers are assigned, the first device 11, in step 505, generates a Bloom filter for all of the ROs, which should include the TSRO, that were assigned identifiers. The Bloom filter can be generated using any publicly available and standardized hash functions, such as MD5 (standardized by the Internet Engineering Task Force in RFC 1321), SHA-1 (standardized by the National Institute of Standards and Technology in FIPS PUB 180-1), and HMAC (standardized by the Internet Engineering Task Force in RFC 2104). Then, in step 507, the first device 11 sends the Bloom filter to the second device 11'. In step 509, the second device 11' queries the Bloom filter, using the unique identifier for the TSRO received in step 501, to determine whether the TSRO is present on the first device 11. If the Bloom filter returns a positive value (i.e. the TSRO is present on the first device 11), the process flows to step 407 and the TSRO is transferred to the second device 11'. Otherwise, if the Bloom filter returns a negative value (i.e. the TSRO is not present on the first device), then an error condition occurs and the process is terminated at step 405.

Figure 6:
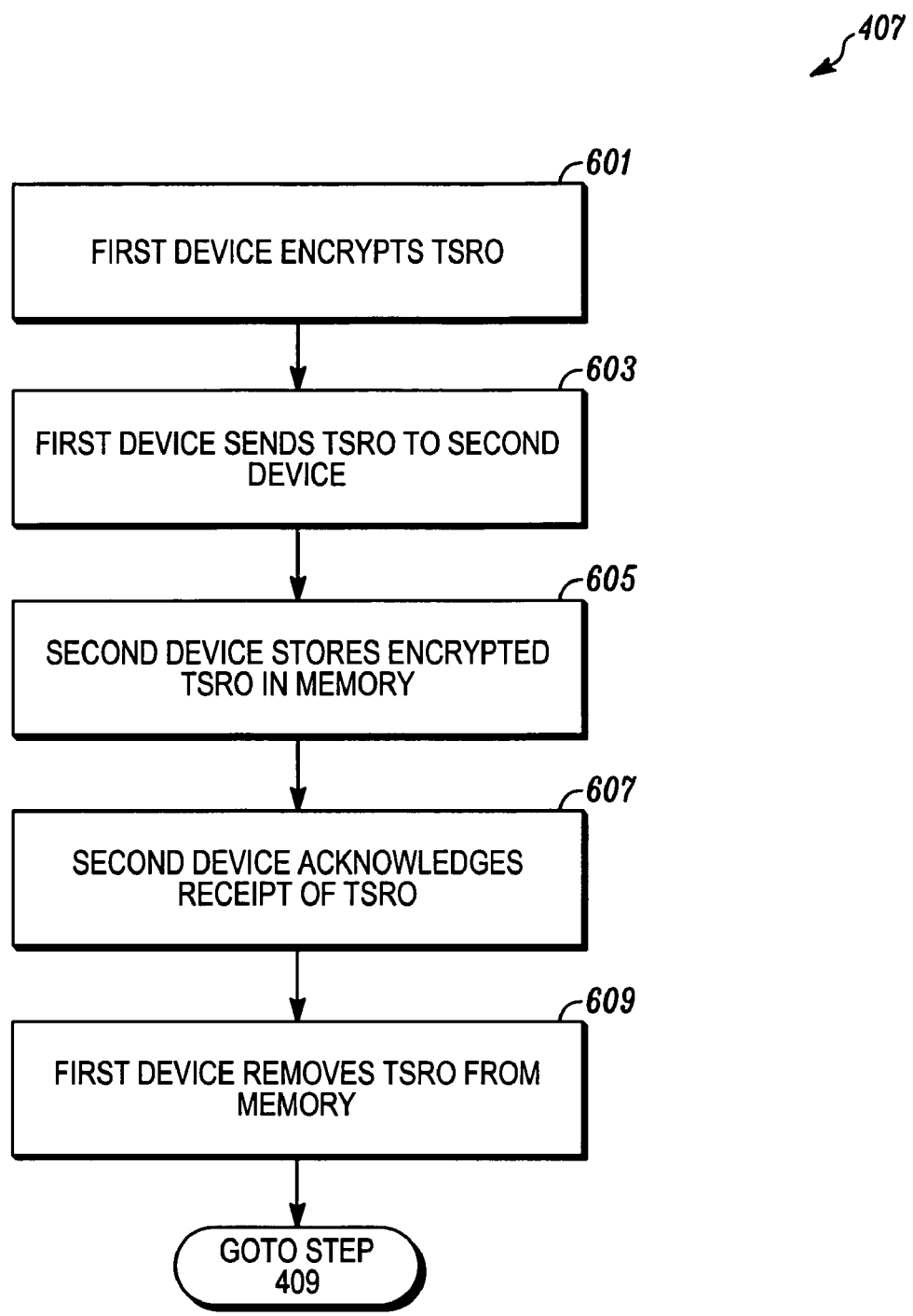
FIG. 6 is a flowchart depicting one embodiment of the step for transferring a digital rights object in the method of FIG. 4.

Referring to FIG. 6, an exemplary embodiment of step 407, in which the method transfers the TSRO to the second device 11', is now provided for illustrative purposes.

In step 601, the first device 11 encrypts the TSRO. In one example, the first device 11 encrypts the TSRO using a publicly available and standardized encryption method, such as AES (standardized by the National Institute of Standards and Technology in FIPS PUB 197), 3DES (standardized by the National Institute of Standards and Technology in FIPS PUB 46-2), and RC4 (publicly available from RSA Security Laboratories). In step 603, the first device 11 sends the encrypted TSRO to the second device 11'. In step 605, the second device 11 ' stores the encrypted TSRO in the second device 11' memory. In step 607, the second device 11' acknowledges receipt of the encrypted TSRO. In step 609, after receiving the acknowledgement from the second device 11', the first device 11 removes all instances of the TSRO from its memory, which means that if the first device 11 contains a copy of the encrypted version of the TSRO in its memory, then the encrypted version is also removed from memory. After the first 11 device removes all instances of the TSRO from its memory, then flow progresses to step 409 of method 400 in which the verification of the transfer of the TSRO from the first device 11 to the second device 11' occurs.

Figure 7:
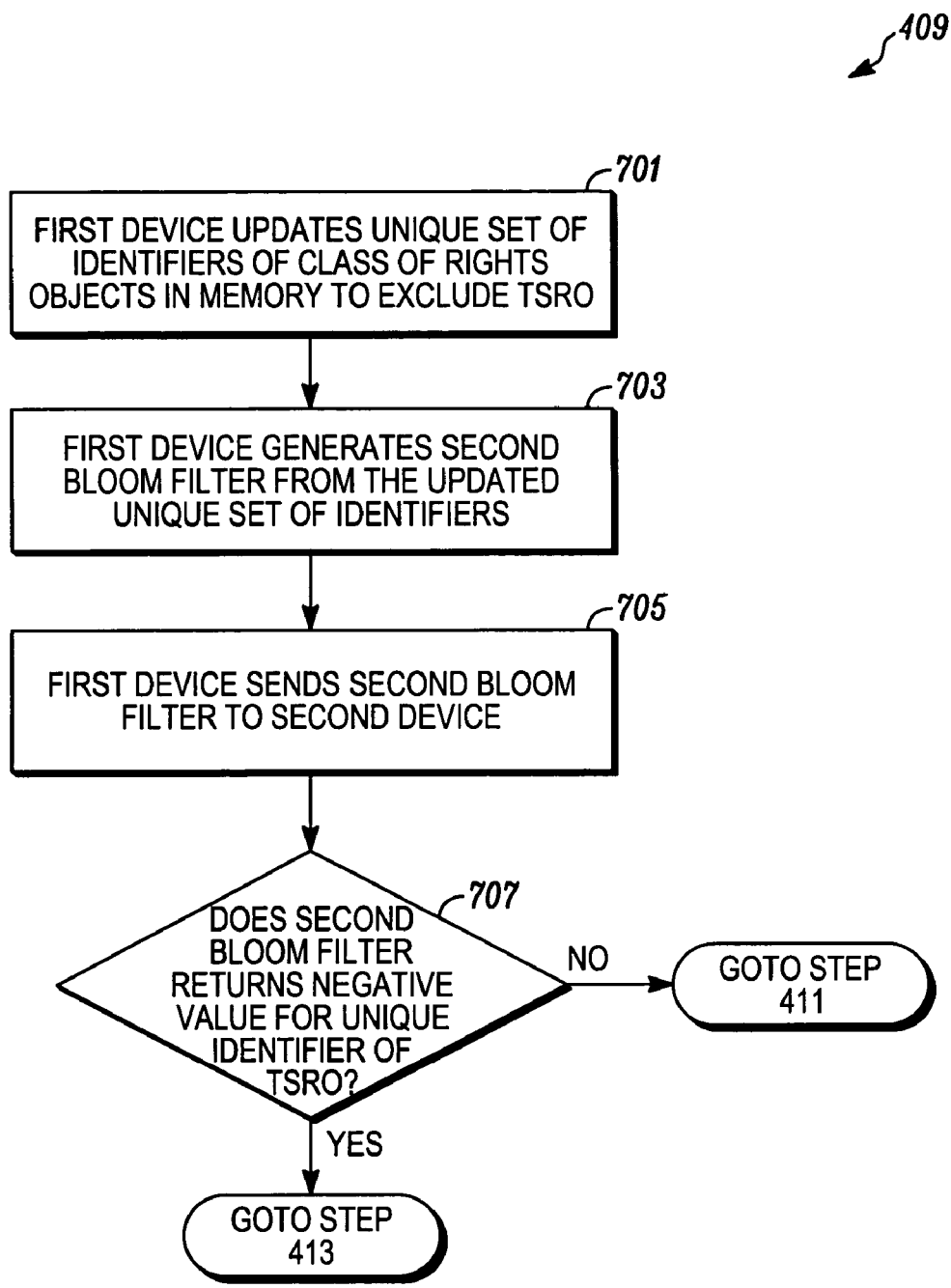
FIG. 7 is a flowchart depicting one embodiment of the step for verifying the transfer of a digital rights object in the method of FIG. 4.

Referring to FIG. 7, an exemplary embodiment of the verification step 409 is now provided for illustrative purposes.

In step 701, the first device 11 updates its list of RO identifiers to exclude the TSRO (since the TSRO has been deleted). In step 703, the first device 11 generates a second bloom filter from the updated class of RO identifiers. The first device 11 generates the second bloom filter in the same way as the first bloom filter in step 403. In step 705, the first device 11 sends the second Bloom filter to the second device 11'. In step 707, the second device 11' queries the second Bloom filter to determine, using the TSRO identifier as input, if the TSRO remains on the first device. If the second Bloom filter returns a positive, then, with a large degree of probability, the first device 11 did not in fact delete the TSRO from its memory. Since there is no way for the second device 11' to determine the status of the RO in the first device 11, then flow transfers to step 411 and the second device 11' returns the TSRO to the first device. Alternatively, the second device 11' could simply remove or delete the TSRO from its memory. By returning the TSRO to the first device 11, however, the method 400, not only provides a means for verifying whether the TSRO has been removed from the first device, but it also ensures that the TSRO not lost or corrupted during the method. One device always holds a copy of the encrypted TSRO. If the encrypted TSRO is returned, the first device 11 simply decrypts it using the same decryption key that it used to encrypt it. The rights will then be restored on the first device 11. If the second Bloom filter returns a negative result in step 707, then, due to the properties of Bloom filters, the second device can be 100% sure that the TSRO no longer exists on the first device. Accordingly, flow passes to the enablement step 413 of FIG. 4.

Figure 8:
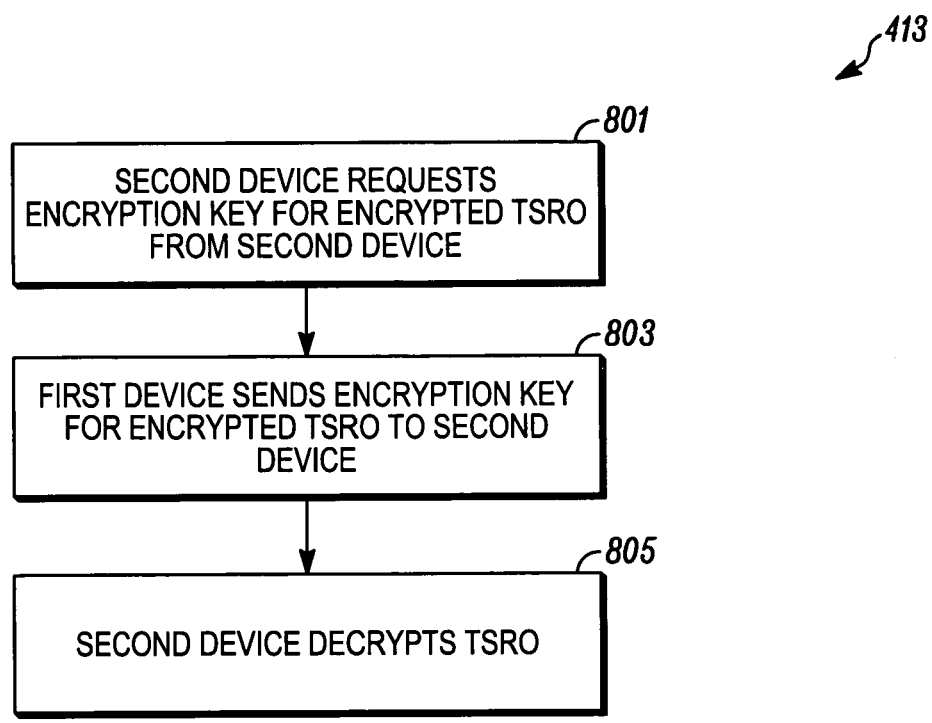
FIG. 8 is a flowchart depicting one embodiment of the step for enabling a digital rights object in the method of FIG. 4.

Referring to FIG. 8, an exemplary description of the enablement step 413 is provided for illustrative purposes.

In step 801, the second device 11' requests the encryption key that the first device 11 used to encrypt the TSRO in step 407. In step 803, the first device 11 sends the encryption key securely to the second device 11' by using any appropriate secure communications protocol, such as SSL, TLS, HTTPS and so on. In step 805, the second device 11' decrypts the TSRO, after which the TSRO will be present and enabled on the second device 11'. After decryption of the TSRO, the process ends in step 807.

It should be noted that the preceding description describes certain steps of method as being performed by first device 11 or second device 11' for illustrative purposes only. This description is not meant to be limiting. It is envisioned that, in other embodiments, the steps could be performed differently. For example, the first device 11 could grant control of its memory to the second device 11' and the second device could query the bloom filter without it being transferred to the second device 11'. As another alternative, a third device could act as an intermediary between the first device 11 and the second device 11'. The third device could be granted control of the first device 11 and perform the steps of assigning identifiers and generating Bloom filters. The third device could then send the Bloom filters to the second device 11'. It should be appreciated that several combinations are possible without departing from the scope of the invention.

A discussion of the use of Bloom filters in the method 400 will now be provided for illustrative purposes.

Figure 9:
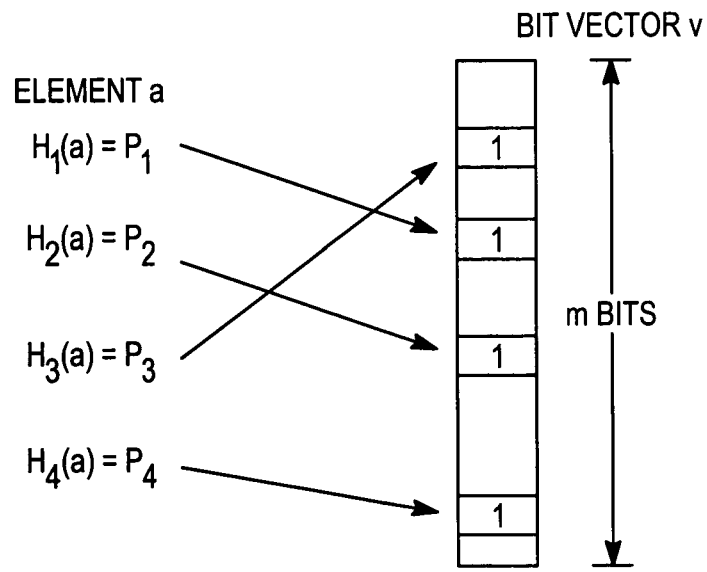
FIG. 9 provides an illustration of an exemplary Bloom filter.

Referring to FIG. 9, a Bloom filter is a probabilistic data structure for representing a set $A=\{a_1, a_2, \ldots, a_n\}$ of n elements (also called keys) to support membership queries. In the method 400 of FIG. 4, the set A represents the class of ROs, for which one of the devices 11, will create a Bloom filter. The variable a represents the unique identifier for each RO. The variable n represents the total number of ROs in the class. The Bloom filter is created by creating a vector v of m bits, which are all initially set to 0. Then, k independent hash functions, $h_1, h_2, \ldots, h_k$, each with range $\{1, \ldots, m\}$ are chosen. The unique identifier a for each RO is provided as input to the k hash functions. The output of each hash function, $h_1(a)$, $h_2(a), \ldots, h_k(a)$, corresponds to a position in the vector V. For each hash function output, $h_1(a), h_2(a), \ldots, h_k(a)$, the corresponding bit in v is set to 1. To query for a particular RO, a device inputs the unique identifier a into the k hash functions. Once again, each hash function output will correspond to a position in the vector v. The device then checks all of the bits at the positions outputted from the hash functions. If any of the bits is 0, then a is not in the set A. Otherwise, one can conjecture that a is in the set although there is a certain probability that we are wrong. This is called a "false positive."

The parameters k and m should be chosen such that the probability of a false positive (and hence a false hit) is acceptable. The value of m is a design parameter that is chosen to trade-off the probability of a false positive with storage in the devices. Each RO identifier is associated with an m-bit vector. The higher the value of m, the longer the m-bit vector becomes, and the higher the storage requirement in the device. On the other hand, the higher the value of m, the lower the false positive rate.

The number of hash functions (i.e. the value of k) is found by the following formula once the values of m and n are determined.

$$\left(\frac{1}{2}\right)^k = (0.6185)^{m/n}.$$

The value of k must be an integer, but the formula may produce a non-integer value, so in practice, it might be necessary to choose a value less than optimal to reduce computational overhead. A methodology for determining appropriate values of k, m, and n for Bloom filters can be found in an article published by J. Marais and K. Bharat entitled *Supporting Cooperative and Personal Surfing with a Desktop Assistant*, Proceedings of ACM UIST'97, October 1997 (Available on-line at ftp://ftp.digital.com/pub/DEC/SRC/publications/marais/uist97paper.pdf), which is hereby incorporated by reference.

While particular embodiments have been shown and described, it will be apparent to those skilled in the art that changes and modifications may be made without departing from the principles set forth herein. The matter set forth in the foregoing description and accompanying drawings is offered by way of illustration only and not as a limitation.

The invention claimed is:

1. A method of transferring digital rights from a first device to a second device, the method comprising:
    transferring a target rights management object from the first device to the second device;
    creating a probabilistic data structure at the first device that identifies each of a class of rights management objects that are present on the first device;
    sending the probabilistic data structure from the first device to the second device;
    employing the probabilistic data structure at the second device to determine whether the target rights management object is present on the first device; and
    utilizing the target rights management object on the second device in response to a determination through employment of the probabilistic data structure that the target rights management object is not present on the first device.

2. The method of claim 1, wherein the step of transferring comprises:
creating an encrypted target rights management object by encrypting the target rights management object with an encryption key;
sending the encrypted target fights management object to the second device; and
removing the target rights management object from the first device upon receipt of an acknowledgement from the second device that it received the encrypted version of the target rights management object.

3. The method of claim 2, further comprising:
requesting the encryption key used to encrypt the target rights management object in response to a determination through employment of the probabilistic data structure that the target rights management object is not present on the first device;
receiving the encryption key; and
decrypting the encrypted target rights management object with the encryption key.

4. The method of claim 1, wherein the step of creating a probabilistic data structure comprises:
generating a bloom filter that includes a bit representation of each of the class of rights management objects that are present on the first device.

5. The method of claim 4, wherein the step of utilizing comprises:
querying the bloom filter to determine whether the target rights management object is present on the first device.

6. The method of claim 4, wherein the step of generating the bloom filter comprises:
assigning a unique identifier to each rights management object present on the first device.

7. The method of claim 6, wherein the step of generating the bloom filter further comprises:
providing the unique identifier of each rights management object as an input to at least one hash function to create at least one hash value; and
asserting a bit in the bloom filter, corresponding to the at least one hash value, as positive.

8. The method of claim 6, wherein the step of assigning the unique identifier comprises:
computing the identifier by using a combination of each rights management object and each rights management object's state as input to a hash function.

9. The method of claim 1, further comprising:
verifying that the target rights management object is present on the first device prior to transferring the target rights management object to the second device.

10. The method of claim 9, wherein the step of verifying comprises:
assigning a unique identifier to the target rights management object;
generating a bloom filter that includes a bit representation of each of a class of rights management objects that are present on the first device; and
querying the bloom filter to determine whether a bit representation of the target rights management object is present on the first device.

11. The method of claim 1, wherein the step of creating the probabilistic data structure comprises:
creating the probabilistic data structure such that the class of rights management objects includes all stateful rights objects on the first device.

12. The method of claim 1, wherein the step of creating the probabilistic data structure comprises:
creating the probabilistic data structure such that that class of rights management objects includes a portion of stateful rights objects on the first device.

13. The method of claim 1, wherein the target rights management object is a stateful rights object created in accordance with the Open Mobile Alliance (OMA) Digital Rights Management (DRM) 2.0 standard.

* * * * *